(12) United States Patent
Moon et al.

(10) Patent No.: US 10,938,952 B2
(45) Date of Patent: Mar. 2, 2021

(54) SCREEN READER SUMMARY WITH POPULAR LINK(S)

(71) Applicant: Microsoft Technology Licensing, LLC, Redmond, WA (US)

(72) Inventors: Mariah Sigourney Moon, Seattle, WA (US); Sichen Lu, Bellevue, WA (US); Vanguri Madhuri, Redmond, WA (US); Lukasz Zygmunt Makar, Bellevue, WA (US); Ravi Gupta, Seattle, WA (US); Jason Anthony Grieves, Bellevue, WA (US); Carolina Hernandez, Seattle, WA (US); Elbio Renato Torres Abib, Bellevue, WA (US); Jane Jayoung Yoon, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/589,522

(22) Filed: Oct. 1, 2019

(65) Prior Publication Data
US 2020/0396314 A1    Dec. 17, 2020

Related U.S. Application Data

(60) Provisional application No. 62/861,225, filed on Jun. 13, 2019.

(51) Int. Cl.
*H04L 29/08* (2006.01)
*G06F 16/955* (2019.01)
(Continued)

(52) U.S. Cl.
CPC ........ *H04L 67/327* (2013.01); *G06F 16/9535* (2019.01); *G06F 16/9538* (2019.01); *G06F 16/9558* (2019.01); *G06F 16/9566* (2019.01)

(58) Field of Classification Search
CPC .............. H04L 67/327; G06F 16/9558; G06F 16/9566; G06F 16/9535; G06F 16/9538
See application file for complete search history.

(56) References Cited

U.S. PATENT DOCUMENTS

| 2002/0120645 A1 | 8/2002 | Adapathya et al. |
| 2003/0105744 A1* | 6/2003 | McKeeth .............. G06F 16/951 |

(Continued)

OTHER PUBLICATIONS

"HTML usage on the web platform", Retrieved from https://developer.microsoft.com/en-us/microsoft-edge/platform/usage/html/, Aug. 20, 2019, 2 Pages.

(Continued)

*Primary Examiner* — Viet D Vu
(74) *Attorney, Agent, or Firm* — Rainier Patents, P.S.

(57) ABSTRACT

Described herein is a screen reader providing a summary with popular link(s). The screen reader can provide a request for popular link information regarding a particular web resource to a search engine. The request can include a URL associated with the particular web resource. The request can be provided in response to a user request for a summary and/or the request can be provided based upon a user configurable setting (e.g., a quantity of popular links to be displayed). The screen reader can receive popular link information regarding the particular web resource from the search engine. The screen reader can then provide a summary comprising at least some of the received popular link information to the user. In response to selection of a particular popular link, the screen reader can redirect the browser to display a web resource associated with the particular popular link.

20 Claims, 5 Drawing Sheets

(51) Int. Cl.
    *G06F 16/9535*   (2019.01)
    *G06F 16/9538*   (2019.01)

(56) References Cited

U.S. PATENT DOCUMENTS

| | | | | |
|---|---|---|---|---|
| 2006/0036966 | A1* | 2/2006 | Yevdayev | G06F 16/951 |
| | | | | 715/779 |
| 2007/0094250 | A1* | 4/2007 | Kapur | G06F 16/951 |
| 2009/0249229 | A1* | 10/2009 | Offer | G06Q 30/02 |
| | | | | 715/760 |
| 2013/0063494 | A1* | 3/2013 | Kirschner | G09B 21/006 |
| | | | | 345/661 |

OTHER PUBLICATIONS

"JAWS 14 New Features, Part Two—Flexible Web", Retrieved from https://doccenter.freedomscientific.com/doccenter/doccenter/rs25c51746a0cc/2012-10-24_WhatIsNewJAWS14-L2/02_JAWS14-NewFeatures-L2.htm, Aug. 20, 2019, 8 Pages.

"Volcano—Wikipedia", Retrieved from https://en.wikipedia.org/wiki/Volcano, Aug. 20, 2019, 17 Pages.

Jacobs, et al., "Windows Information Protection (WIP)", Retrieved from https://docs.microsoft.com/en-us/windows/uwp/enterprise/wip-hub, Aug. 2, 2017, 5 Pages.

Brin, et al., "The Anatomy of a Large-Scale Hypertextual Web Search Engine", In Computer Networks and ISDN Systems, vol. 30, Issue 1-7, Apr. 1, 1998, pp. 107-117.

"International Search Report and Written Opinion Issued in PCT Application No. PCT/US20/030165", dated Jul. 15, 2020, 14 Pages.

* cited by examiner

SCREEN READER SUMMARY WITH POPULAR LINK(S)

RELATED APPLICATION(S)

This application claims priority to U.S. Provisional Application No. 62/861,225, filed Jun. 13, 2019, entitled "Screen Reader Summary with Popular Link(s)", the disclosure of which is hereby incorporated by reference herein in its entirety.

BACKGROUND

Screen reader(s) can verbally provide information regarding object(s) (e.g., content) displayed to a user. The information provided can assist visually impaired user(s) to understand and/or navigate displayed content. For example, the screen reader can read text to the user and/or verbally provide information regarding control(s) and/or other object(s) that are being displayed. User(s) can interact with the screen reader, for example, using pre-defined key(s) of a keyboard and/or via other user input device(s).

SUMMARY

Described herein is a system for providing a summary with popular link(s) by a screen reader, comprising: a computer comprising a processor and a memory having computer-executable instructions stored thereupon which, when executed by the processor, cause the computer to: receive input from a user requesting summary information about a particular web resource; in response to the received user input, provide a request for popular link information regarding the particular web resource to a search engine, the request comprising a uniform resource locator (URL) associated with the particular web resource; receive popular link information regarding the particular web resource from the search engine; and provide a summary comprising at summary comprising at least some of the received popular link information to the user in response to the received request for summary information.

Also described herein is a method of providing a summary with popular link(s) by a screen reader, comprising: in response to a user request to load a particular web resource, providing a request for popular link information regarding the particular web resource to a search engine, the request comprising a uniform resource locator (URL) associated with the particular web resource; receiving popular link information regarding the particular web resource from the search engine; and providing at least some of the received popular link information to the user in a summary.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
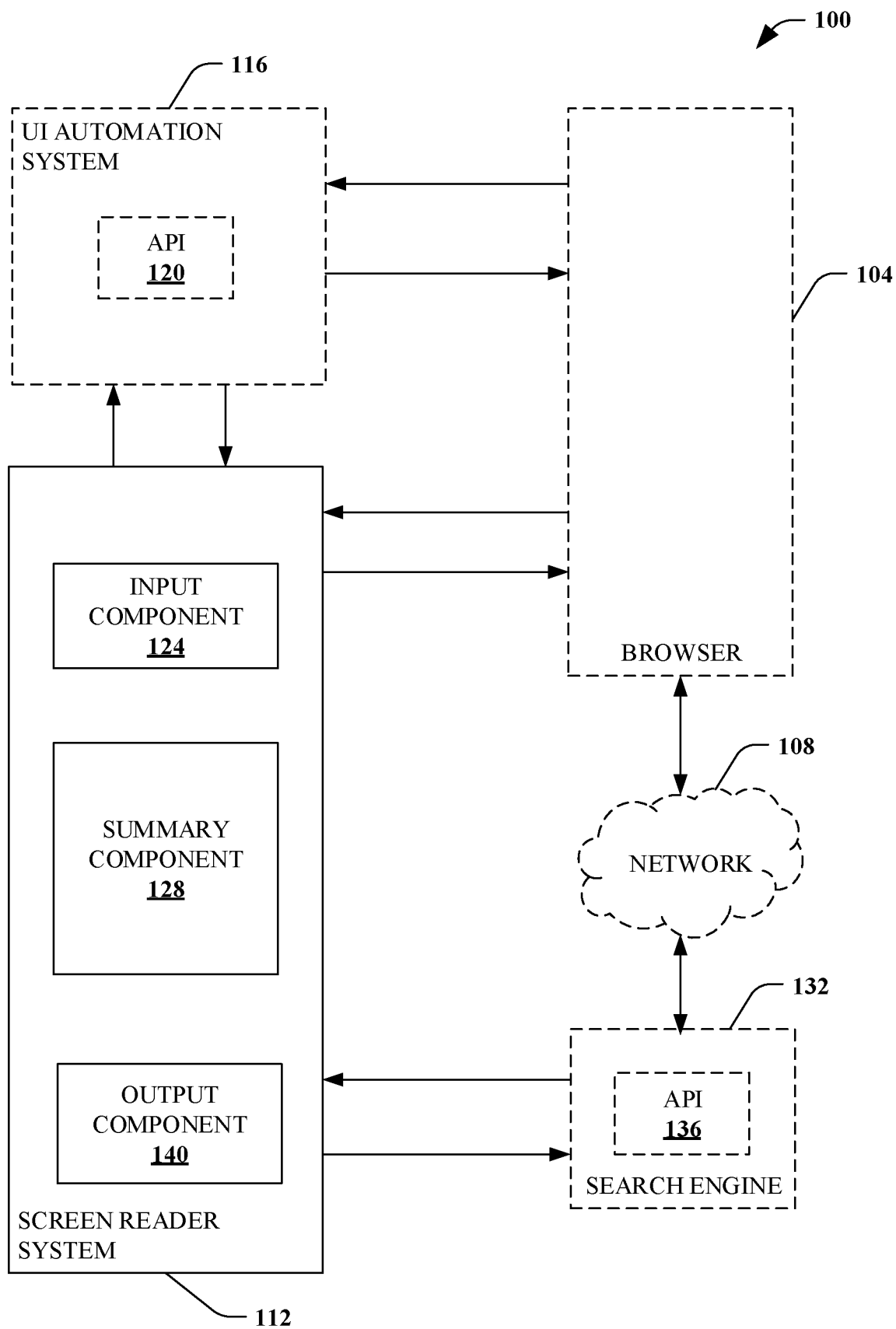
FIG. 1 is a functional block diagram that illustrates a system for providing a summary with popular link(s) by a screen reader.

Various technologies pertaining to providing a summary with popular link(s) by a screen reader are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding providing a summary with popular link(s) by a screen reader. What follows are one or more exemplary systems and methods.

Aspects of the subject disclosure pertain to the technical problem of providing a summary with popular link(s) by a screen reader. The technical features associated with addressing this problem involve receiving input from a user requesting summary information about a particular web resource; in response to the received user input, provide a request for popular link information regarding the particular web resource to a search engine, the request comprising a uniform resource locator (URL) associated with the particular web resource; receiving popular link information regarding the particular web resource from the search engine; and providing a summary comprising at least some of the received popular link information to the user in response to the received request for summary information. Accordingly, aspects of these technical features exhibit technical effects of more efficiently and effectively providing summary information to a user, for example, reducing consumption of computer resource(s) and/or bandwidth.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

Web pages have become increasingly complex allowing user to navigate to content within the web page and/or to other content of other web page(s). Understanding these complex webpage(s) using a screen reader can be a frustrating experience for a computer user.

Described herein is a system and method for providing a summary with popular link(s) by a screen reader. In some embodiments, "popular link(s)" includes frequently selected (e.g., clicked) link(s) on a web resource such as a web page and/or a web site (e.g., as determined by a search engine) ordered by relevance and/or frequency of visits. In some embodiments, "popular link(s)" can be personalized to a user based, at least in part, on a browsing history of the user (e.g., with explicit consent of the user). For example, popular link(s) can be personalized for a user that typically accesses a given internal site. In some embodiments, "popular link(s)" can be personalized to the user interest determined based upon a current browsing session of the user (e.g., with consent of the user, when the user is in a session where the user is looking for furniture on site A, so the system can offer a furniture popular link when the user goes to another site B in the same session). The summary can assist the user to understand complexities of a particular web resource including a size of the web page, information regarding how to navigate and/or interact with the web page.

In some embodiments, the screen reader can provide (e.g., read, voice) a short summary before starting to read the web page. Thus, the screen reader can provide contextual information allowing the user to more easily understand and/or navigate content of the web page and/or other content of other web page(s).

Referring to FIG. 1, a system for providing a summary with popular link(s) by a screen reader 100 is illustrated. For example, the summary can provide information regarding heading(s), landmark(s), link(s), and/or popular link(s) of a particular web resource.

In some embodiments, the web resource can comprise a web page (e.g., HTML document). In some embodiments, the web resource can be a web site.

In some embodiments, a user requests a browser 104 (e.g., a web browser) to load a particular web resource. In some embodiments, the user can request to navigate to a particular web site and load an associated document (e.g., HTML web page).

The browser 104 can obtain the particular web resource from a network 108 (e.g., the Internet) and load the particular web resource. The browser 104 can further place a user interface (UI) focus on the particular web resource (e.g., display the particular web page).

The browser 104 can display the particular web resource to the user and, optionally, provide information regarding the particular web resource to a screen reader system 112. The browser 104 can further provide information regarding the particular web resource to a user interface automation system 116 that allows the screen reader system 112 (e.g., and other component(s)) to have access to, identification of, and/or manipulation of user interface (UI) element(s) of the browser 104 (e.g., web browser), for example, through an application programming interface 120 (e.g., Microsoft® UI Automation API). Thus, in some embodiments, the screen reader system 112 can receive information regarding the particular web resource using the API 120 of the UI automation system 116.

In some embodiments, the particular web resource is displayed to the user by the browser 104, information provided to the screen reader system 112, and, information provided to the user interface automation system 116 substantially in parallel. In some embodiments, information is provided to the screen reader system 112 and/or the user interface automation system 116 before the particular web resource is displayed to the user by the browser 104.

The screen reader system 112 comprises an input component 124 that receives input from a user requesting summary information about the particular web resource. In some embodiments, the received input comprises a keyboard command comprising one or more keys (e.g., sequentially and/or in combination).

In some embodiments, the input is generated based upon a stored user configurable setting. Thus, based, at least in part, upon the stored configurable setting, the input component 124 can request summary information about the particular web resource. In some embodiments, a user can select a setting indicating that a summary is to be requested for each web page (e.g., before, during, and/or after loading of the web page). In some embodiments, a user can select a setting indicating that a summary is to be requested for each web page that the user has not previously visited (e.g., based upon a cached browsing history of the user). In some embodiments, a user can select a setting indicating a particular search engine 132 of a plurality of search engines 132 to send the request for summary information about the particular web resource.

In some embodiments, the summary request can be received and/or generated before the particular web resource has been displayed. In some embodiments, the input component 124 can generate the request based upon a stored configurable setting in response to receipt of information indicating the user's desire to load the particular web resource.

In some embodiments, the summary request can be received and/or generated while the particular web resource is being loaded. In some embodiments, the summary request can be received and/or generated after the particular web resource has been displayed.

The screen reader system 112 further includes a summary component 128 that, in response to the received user input, provides a request for popular link information regarding the particular web resource to a search engine 132 that maintains information regarding popular links of web pages. In some embodiments, the request includes a uniform resource locator (URL) associated with the particular webpage.

In some embodiments, the summary component 128 provides the request for popular link information using an application programming interface 136 of the search engine 132 (e.g., Bing®). In response to a request including a URL, the search engine 132 provides popular link information associated with the particular URL of the particular web resource.

In some embodiments, the popular link information comprises a predefined quantity of popular links associated with the particular web resource. In some embodiments, the popular link information comprises information regarding a plurality of links associated with the particular web resource (e.g., web page and/or web site) ranked in order of popularity (e.g., most frequently selected link first, second most frequently selected next, etc.). In some embodiments, the popular link information comprises information regarding all links associated with the particular web resource (e.g., web page and/or web site) ranked in order of popularity (e.g., ten, twenty, one hundred).

The popular link component 128 receives the popular link information regarding the particular web resource from the search engine 132. In some embodiments, the popular link component 128 filters the popular link information, for example, based upon a predefined maximum quantity of popular links to be displayed and/or provided (e.g., user-configurable). At least some of the received popular link information is provided to the user via an output component 140 (e.g., screen reader). In some embodiments, the output component 140 can read the summary including the popular links before starting to read the particular web resource.

In some embodiments, using the input component 124, a user can select one of the popular links. In response to this selection, the screen reader system 112 can redirect the browser 104 to a web resource referenced by the selected popular link (e.g., using an associated URL), and, not just set focus to the selected popular link (e.g., which would require further user interaction to navigate to the web resource associated with the selected link).

In some embodiments, the screen reader system 112 can generate a summary comprising at least some of the received popular link information. In some embodiments, the screen reader system 112 can include additional information regarding a quantity of landmark(s), heading(s), and/or link(s) of the particular web resource in the summary. The screen reader system 112 can determine this additional information using information regarding the particular web resource obtained from the API 120 of the UI automation system 116.

In some embodiments, the screen reader system 112 can generate a summary including popular link(s) based, at least in part, upon information obtained from a cloud-based link service (not shown). Users of a plurality of screen readers 112 and/or users of web browsers 104 can manually identify significant and/or popular link(s) associated with particular web resources (e.g., web pages and/or web sites). For example, users can add, mark, vote up, and/or vote down popularity of particular link(s) associated with a particular web resource (e.g., web page and/or web site).

The cloud-based link service can aggregate this information on a per web resource basis (e.g., indexed by URL) and provide this information to the screen reader system 112 when the screen reader system 112 is generating a summary. The summary component 128 can utilize this information in addition to and/or in place of the information regarding popular link(s) provided by the search engine 132.

In some embodiments, the screen reader system 112 can generate a summary of area(s) based, at least in part, upon information obtained using a web resource analysis model trained to determine area(s) of significance of web resource(s). In response to navigation to a particular web resource, the screen reader system 112 can utilize the model to generate a summary of significant area(s).

In some embodiments, the model can be been trained using a machine learning process that utilizes various features present in the data of a plurality of web resources (e.g., web sites and/or web pages) with the model representing an association among the features. In some embodiments, the model is trained using one or more machine learning algorithms including linear regression algorithms, logistic regression algorithms, decision tree algorithms, support vector machine (SVM) algorithms, Naive Bayes algorithms, a K-nearest neighbors (KNN) algorithm, a K-means algorithm, a random forest algorithm, dimensionality reduction algorithms, Artificial Neural Network (ANN), and/or a Gradient Boost & Adaboost algorithm. The model can be trained in a supervised, semi-supervised and/or unsupervised manner. In some embodiments, the model can be adaptively updated based, at least in part, upon a user's interaction with the screen reader system 112.

In this manner, the model can be trained to direct a user to significant (e.g., popular) spots on a page (e.g., forms, login, ads, etc.). For example, web resource(s) without accessibility landmark(s) can be more readily accessible to user(s).

Figure 2:
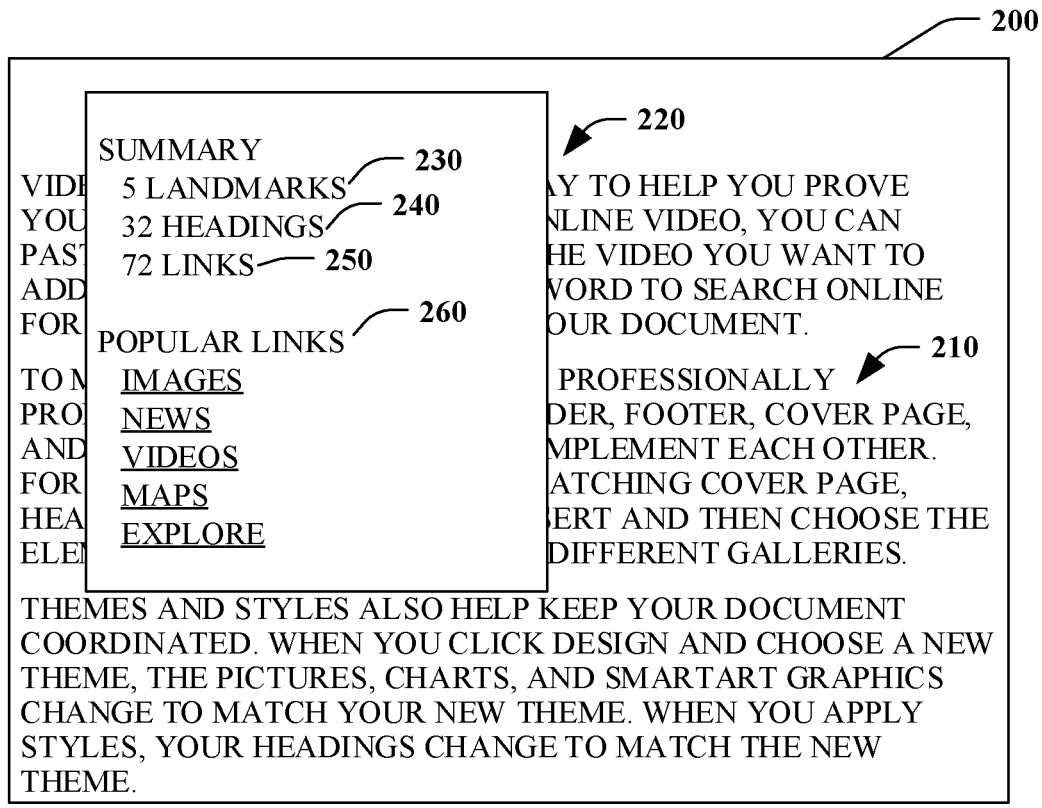
FIG. 2 is a diagram of an exemplary user interface.

Turning to FIG. 2, an exemplary user interface 200 is illustrated. The user interface 200 includes information associated with a displayed web page 210. In this example, a summary 220 overlays the displayed web page 210. The summary 220 includes information regarding landmark(s) 230, information regarding heading(s) 240, information regarding links 250, and/or information regarding popular link(s) 260.

Figure 3:
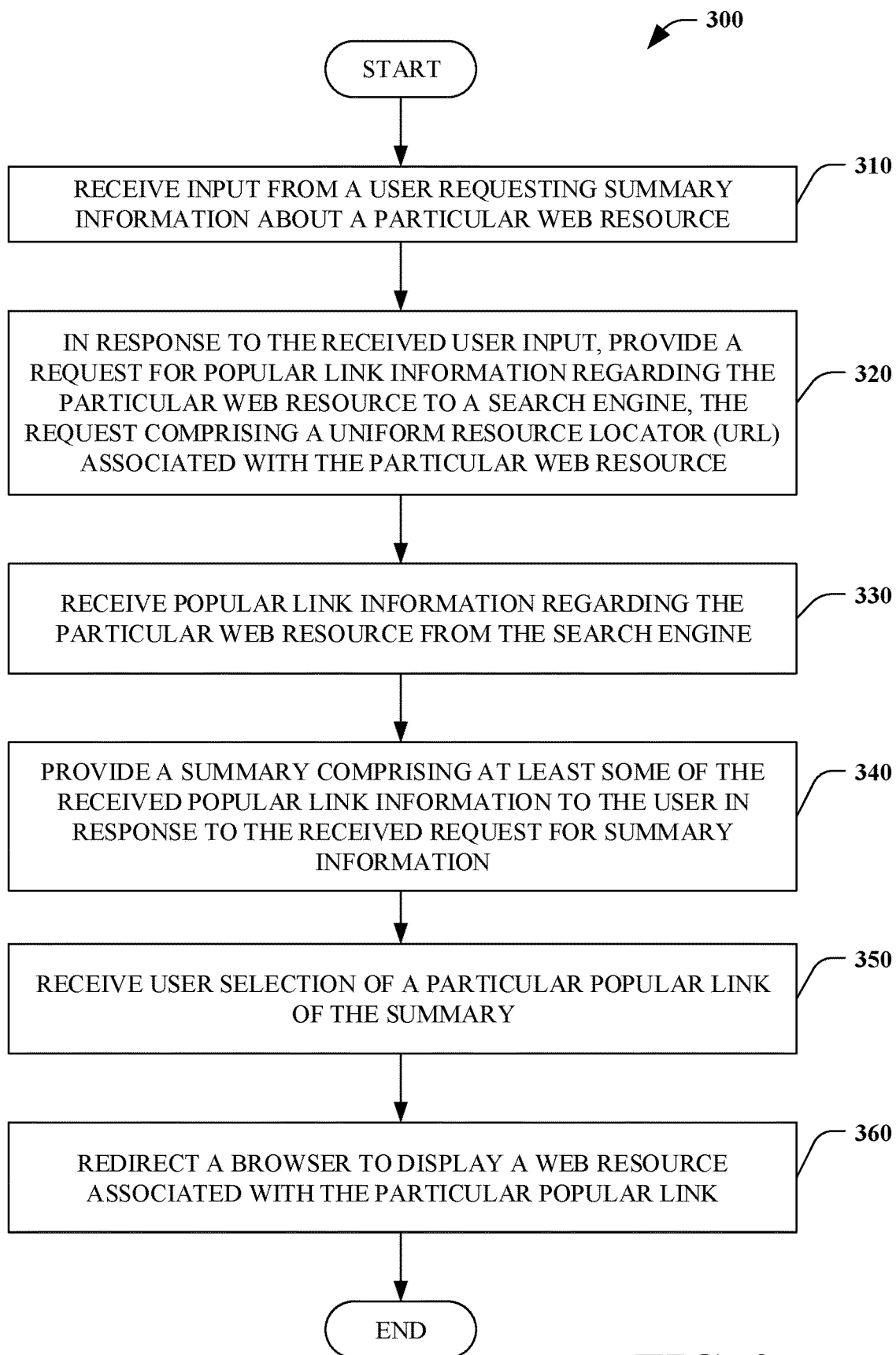
FIG. 3 is a flow chart that illustrates a method of providing a summary with popular link(s) by a screen reader.
Figure 4:
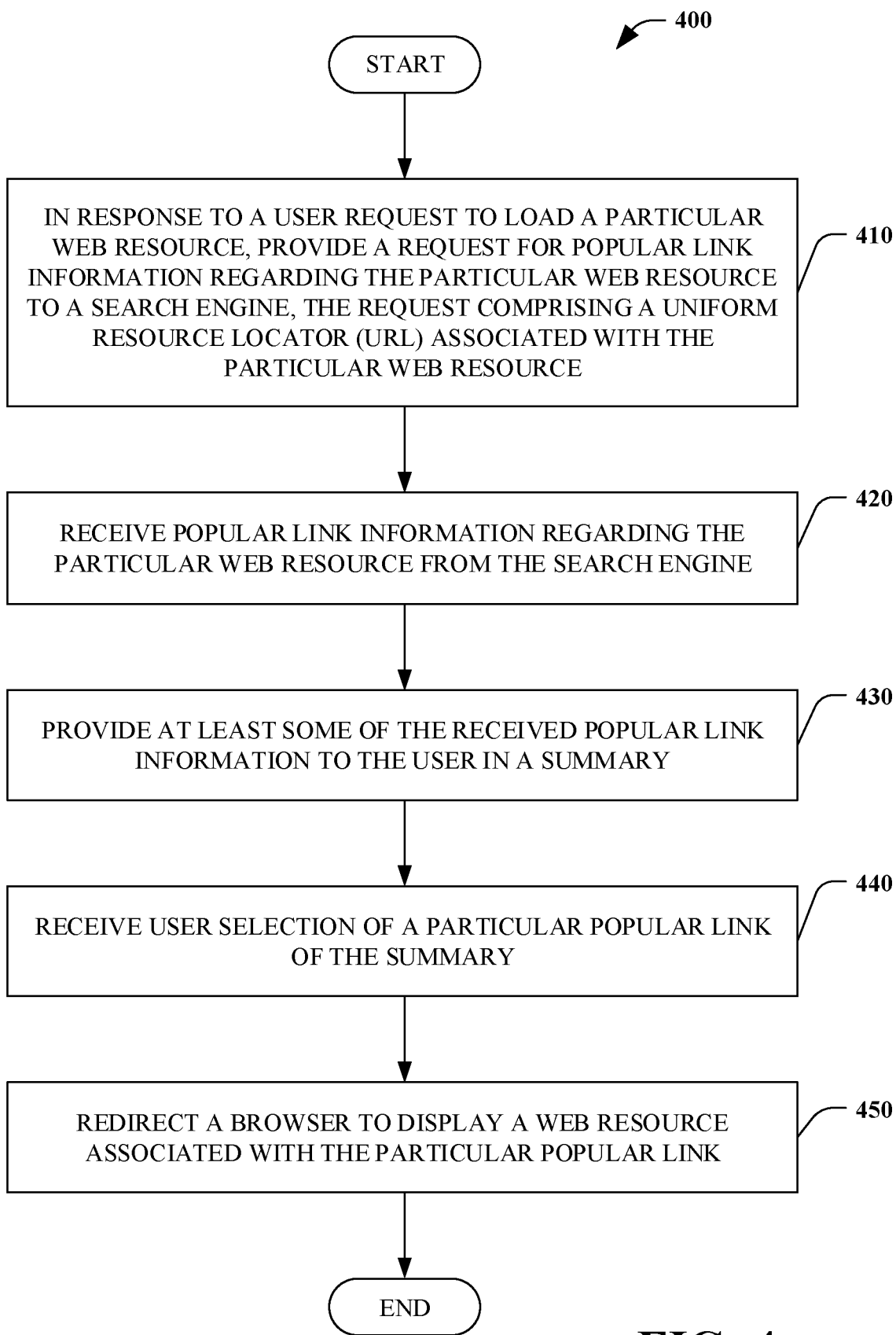
FIG. 4 is a flow chart that illustrates a method of providing a summary with popular link(s) by a screen reader.

FIGS. 3 and 4 illustrate exemplary methodologies relating to providing a summary with popular link(s) by a screen reader. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring to FIG. 3, a method of providing a summary with popular link(s) by a screen reader 300 is illustrated. In some embodiments, the method 300 is performed by the system 100.

At 310, input is received from a user requesting summary information about a particular web resource. At 320, in response to the received user input, a request for popular link information regarding the particular web resource is provided to a search engine. The request can include a uniform resource locator (URL) associated with the particular web resource.

At 330, popular link information regarding the particular web resource is received from the search engine. At 340, a summary comprising at least some of the received popular link information is provided (e.g., displayed and/or read) to the user in response to the received request for summary information.

At 350, user selection of a particular popular link of the summary is received. At 360, a browser is redirected (e.g., by the screen reader system 112) to display a web resource (e.g., web page and/or web site) associated with the particular popular link.

Turning to FIG. 4, a method of providing a summary with popular link(s) by a screen reader 400 is illustrated. In some embodiments, the method 400 is performed by the system 100.

At 410, in response to a user request to load a particular web resource, a request for popular link information regarding the particular web resource is provided to a search engine. The request can include a uniform resource locator (URL) associated with the particular web resource.

At 420, popular link information regarding the particular web resource is received from the search engine. At 430, at least some of the received popular link information is provided (e.g., displayed and/or read) to the user in a summary.

At 440, user selection of a particular popular link of the summary is received. At 450, a browser is redirected (e.g., by the screen reader system 112) to display a web resource (e.g., web page and/or web site) associated with the particular popular link.

Described herein is a system for providing a summary with popular link(s) by a screen reader, comprising: a computer comprising a processor and a memory having computer-executable instructions stored thereupon which, when executed by the processor, cause the computer to: receive input from a user requesting summary information about a particular web resource; in response to the received user input, provide a request for popular link information regarding the particular web resource to a search engine, the request comprising a uniform resource locator (URL) associated with the particular web resource; receive popular link information regarding the particular web resource from the search engine; and provide a summary comprising at least some of the received popular link information to the user in response to the received request for summary information.

The system can further include wherein the summary is displayed to the user. The system can further include wherein the summary is provided verbally to the user. The system can include the memory having further computer-executable instructions stored thereupon which, when executed by the processor, cause the computer to: receive user selection of a particular popular link of the summary; and redirect a browser to display a web resource associated with the particular popular link.

The system can further include wherein the popular link information comprises information regarding a plurality of links associated with the particular web resource ranked in order of selection frequency. The system can further include wherein the popular link information comprises information regarding all links associated with the particular web resource ranked in order of selection frequency. The system can include the memory having further computer-executable instructions stored thereupon which, when executed by the processor, cause the computer to: filter the received popular link information based upon a predefined maximum quantity of popular links to be provided.

Described herein is a method of providing a summary with popular link(s) by a screen reader, comprising: in response to a user request to load a particular web resource, providing a request for popular link information regarding the particular web resource to a search engine, the request comprising a uniform resource locator (URL) associated with the particular web resource; receiving popular link information regarding the particular web resource from the search engine; and providing at least some of the received popular link information to the user in a summary.

The method can further include receiving user selection of a particular popular link of the summary; and redirecting a browser to display a web resource associated with the particular popular link. The method can further include wherein the summary is displayed to the user. The method can further include wherein the summary is provided verbally to the user.

The method can further include wherein providing the request for popular link information regarding the particular web resource to the search engine is based, at least in part, upon a user configurable setting. The method can further include wherein the user configurable setting comprises generating the request to voice or display a summary for each web page. The method can further include wherein the user configurable setting comprises generating the request to voice or display a summary for each web page not previously visited.

Described herein is a computer storage media storing computer-readable instructions that when executed cause a computing device to: receive input from a user requesting summary information about a particular web resource; in response to the received user input, provide a request for popular link information regarding the particular web resource to a search engine, the request comprising a uniform resource locator (URL) associated with the particular web resource; receive popular link information regarding the particular web resource from the search engine; and provide a summary comprising at least some of the received popular link information to the user in response to the received request for summary information.

The computer storage media can store further computer-readable instructions that when executed cause a computing device to: receive user selection of a particular popular link of the summary; and redirect a browser to display a web resource associated with the particular popular link. The computer storage media can further include wherein the popular link information comprises information regarding a plurality of links associated with the particular web resource ranked in order of selection frequency.

The computer storage media can further include wherein the popular link information is personalized to the user based, at least in part, upon a browsing history of the user or an interest of the user based upon a current browsing session of the user. The computer storage media can store further computer-readable instructions that when executed cause a computing device to: filter the received popular link information based upon a predefined maximum quantity of popular links to be provided. The computer storage media can further include wherein the summary is displayed to the user, and, provided verbally to the user.

Figure 5:
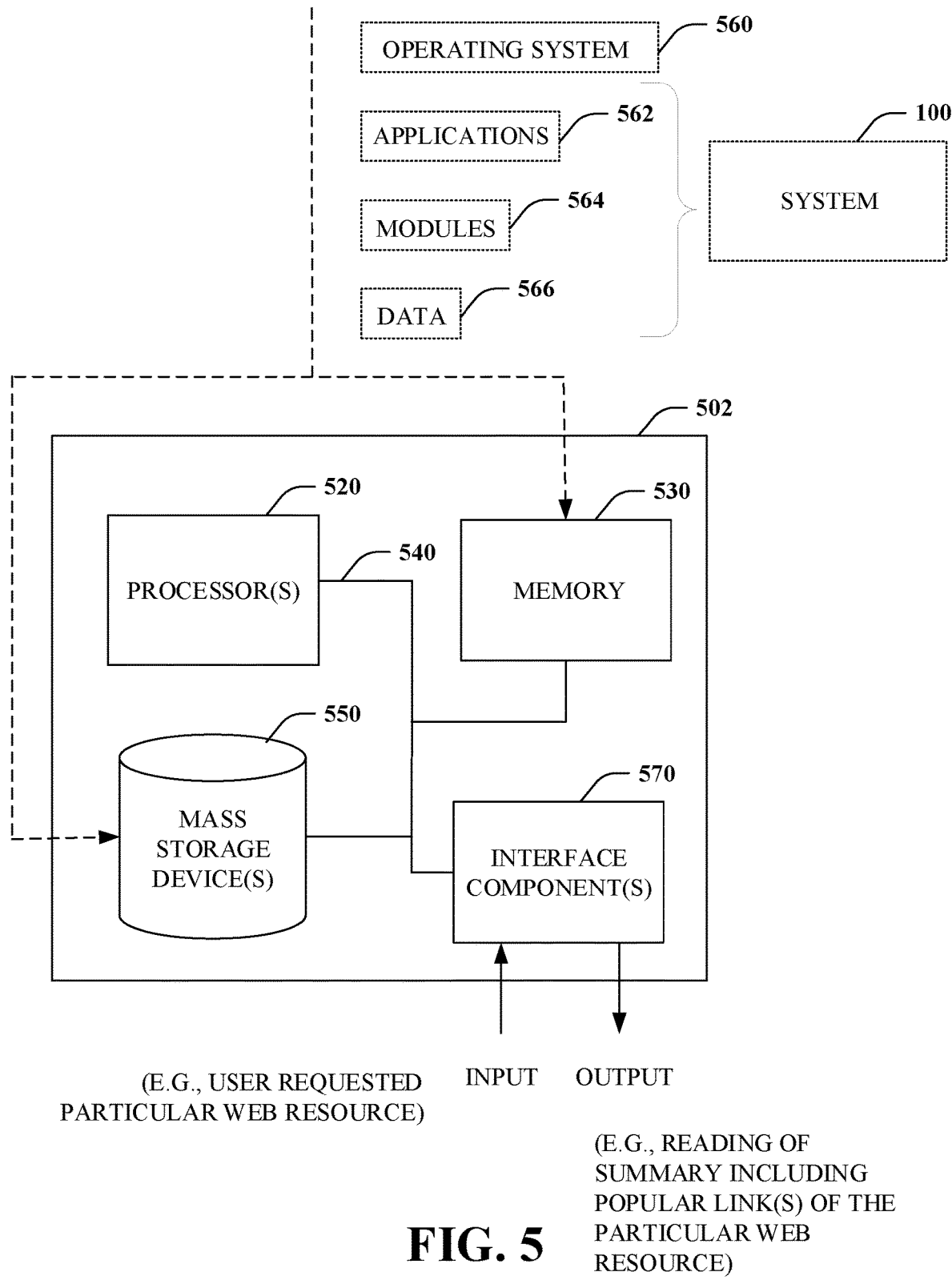
FIG. 5 is a functional block diagram that illustrates an exemplary computing system.

With reference to FIG. 5, illustrated is an example general-purpose computer, processing system or computing device 502 (e.g., mobile phone, desktop, laptop, tablet, watch, server, hand-held, programmable consumer or industrial electronics, set-top box, game system, compute node, etc.). For instance, the computing device 502 may be used in a system for providing a summary with popular link(s) by a screen reader 100.

The computer 502 includes one or more processor(s) 520, memory 530, system bus 540, mass storage device(s) 550, and one or more interface components 570. The system bus 540 communicatively couples at least the above system constituents. However, it is to be appreciated that in its simplest form the computer 502 can include one or more processors 520 coupled to memory 530 that execute various computer executable actions, instructions, and or components stored in memory 530. The instructions may be, for instance, instructions for implementing functionality described as being carried out by one or more components discussed above or instructions for implementing one or more of the methods described above.

The processor(s) 520 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 520 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 520 can be a graphics processor.

The computer 502 can include or otherwise interact with a variety of computer-readable media to facilitate control of the computer 502 to implement one or more aspects of the claimed subject matter. The computer-readable media can be any available media that can be accessed by the computer 502 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 502. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 530 and mass storage device(s) 550 are examples of computer-readable storage media. Depending on the exact configuration and type of computing device, memory 530 may be volatile (e.g., RAM), non-volatile (e.g., ROM, flash memory, etc.) or some combination of the two. By way of example, the basic input/output system (BIOS), including basic routines to transfer information between elements within the computer 502, such as during start-up, can be stored in nonvolatile memory, while volatile memory can act as external cache memory to facilitate processing by the processor(s) 520, among other things.

Mass storage device(s) 550 includes removable/non-removable, volatile/non-volatile computer storage media for storage of large amounts of data relative to the memory 530. For example, mass storage device(s) 550 includes, but is not limited to, one or more devices such as a magnetic or optical disk drive, floppy disk drive, flash memory, solid-state drive, or memory stick.

Memory 530 and mass storage device(s) 550 can include, or have stored therein, operating system 560, one or more applications 562, one or more program modules 564, and data 566. The operating system 560 acts to control and allocate resources of the computer 502. Applications 562 include one or both of system and application software and can exploit management of resources by the operating system 560 through program modules 564 and data 566 stored in memory 530 and/or mass storage device (s) 550 to perform one or more actions. Accordingly, applications 562 can turn a general-purpose computer 502 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 562, and include one or more modules 564 and data 566 stored in memory and/or mass storage device(s) 550 whose functionality can be realized when executed by one or more processor(s) 520.

In some embodiments, the processor(s) 520 can correspond to a system on a chip (SOC) or like architecture including, or in other words integrating, both hardware and software on a single integrated circuit substrate. Here, the processor(s) 520 can include one or more processors as well as memory at least similar to processor(s) 520 and memory 530, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 502 also includes one or more interface components 570 that are communicatively coupled to the system bus 540 and facilitate interaction with the computer 502. By way of example, the interface component 570 can be a port (e.g. serial, parallel, PCMCIA, USB, FireWire, etc.) or an interface card (e.g., sound, video, etc.) or the like. In one example implementation, the interface component 570 can be embodied as a user input/output interface to enable a user to enter commands and information into the computer 502, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 570 can be embodied as an output peripheral interface to supply output to displays (e.g., LCD, LED, plasma, etc.), speakers, printers, and/or other computers, among other things. Still further yet, the interface component 570 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system comprising a processor and a memory having computer-executable instructions stored thereupon which, when executed by the processor, cause the system to:
   receive an input from a user requesting a summary of a particular web resource having a plurality of links;
   in response to the input, provide a request for popular link information regarding the particular web resource to a search engine, the request comprising a uniform resource locator (URL) associated with the particular web resource;
   receive popular link information regarding the particular web resource from the search engine;
   determine popular links as a subset of the plurality of links in the particular web resource based on the popular link information;
   generate the summary including the popular links; and
   provide the summary to the user in response to the input.

2. The system of claim 1, wherein the summary is displayed to the user.

3. The system of claim 1, wherein the summary is provided verbally to the user.

4. The system of claim 1, the memory having computer-executable instructions stored thereupon which, when executed by the processor, cause the system to:
   receive user selection of a particular popular link of the summary; and
   redirect a browser to display a web resource associated with the particular popular link.

5. The system of claim 1, wherein the popular link information comprises information regarding a plurality of links associated with the particular web resource ranked in order of selection frequency.

6. The system of claim 1, wherein the popular link information comprises information regarding all links associated with the particular web resource ranked in order of selection frequency.

7. The system of claim 1, the memory having computer-executable instructions stored thereupon which, when executed by the processor, cause the system to:
   filter the received popular link information based upon a predefined maximum quantity of the popular links to be provided.

8. A method, comprising:
   in response to a user request to load a particular web resource having a plurality of links, providing a request for popular link information regarding the particular web resource to a search engine, the request comprising a uniform resource locator (URL) associated with the particular web resource;
   receiving the popular link information regarding the particular web resource from the search engine;
   determining popular links as a subset of the plurality of links in the particular web resource based on the popular link information;
   generate a summary of the particular web resource, the summary including the popular links; and
   providing the summary to the user.

9. The method of claim 8, further comprising:
   receiving user selection of a particular popular link of the summary; and
   redirecting a browser to display a web resource associated with the particular popular link.

10. The method of claim 8, wherein the summary is displayed to the user and/or provided verbally to the user.

11. The method of claim 8, wherein providing the request for popular link information regarding the particular web resource to the search engine is based, at least in part, upon a user configurable setting.

12. The method of claim 11, wherein the user configurable setting comprises generating the request to voice or display a summary for each web page.

13. The method of claim 11, wherein the user configurable setting comprises generating the request to voice or display a summary for each web page not previously visited.

14. A computer storage media storing computer-readable instructions that when executed cause a computing device to:
   receive an input from a user requesting summary information about a particular web resource having a plurality of links;
   in response to the input, provide a request for popular link information regarding the particular web resource to a search engine, the request comprising a uniform resource locator (URL) associated with the particular web resource;
   receive popular link information regarding the particular web resource from the search engine;
   determine popular links as a subset of the plurality of links in the particular web resource based on the popular link information;
   generate a summary including the popular links; and
   provide the summary to the user in response to the input requesting summary information.

15. The computer storage media of claim 14 storing further computer-readable instructions that when executed cause a computing device to:
   receive user selection of a particular popular link of the summary; and
   redirect a browser to display a web resource associated with the particular popular link.

16. The computer storage media of claim 14, wherein the popular link information comprises information regarding the plurality of links associated with the particular web resource ranked in order of selection frequency.

17. The computer storage media of claim 14, wherein the popular link information is personalized to the user based, at least in part, upon a browsing history of the user or an interest of the user based upon a current browsing session of the user.

18. The computer storage media of claim 14 storing further computer-readable instructions that when executed cause a computing device to:
   filter the received popular link information based upon a predefined maximum quantity of the popular links to be provided.

19. The computer storage media of claim 14, wherein the summary is displayed to the user, and, provided verbally to the user.

20. The system of claim 1, wherein the input is a user request to load the particular web resource.

* * * * *